Dec. 12, 1961  R. P. R. L. SAUNDERS  3,012,715
CENTRE OF GRAVITY CALCULATOR
Filed Jan. 14, 1959  2 Sheets-Sheet 1

Inventor
REGINALD P. R. L. SAUNDERS
by: Cavanagh & Norman

Dec. 12, 1961   R. P. R. L. SAUNDERS   3,012,715
CENTRE OF GRAVITY CALCULATOR
Filed Jan. 14, 1959   2 Sheets-Sheet 2
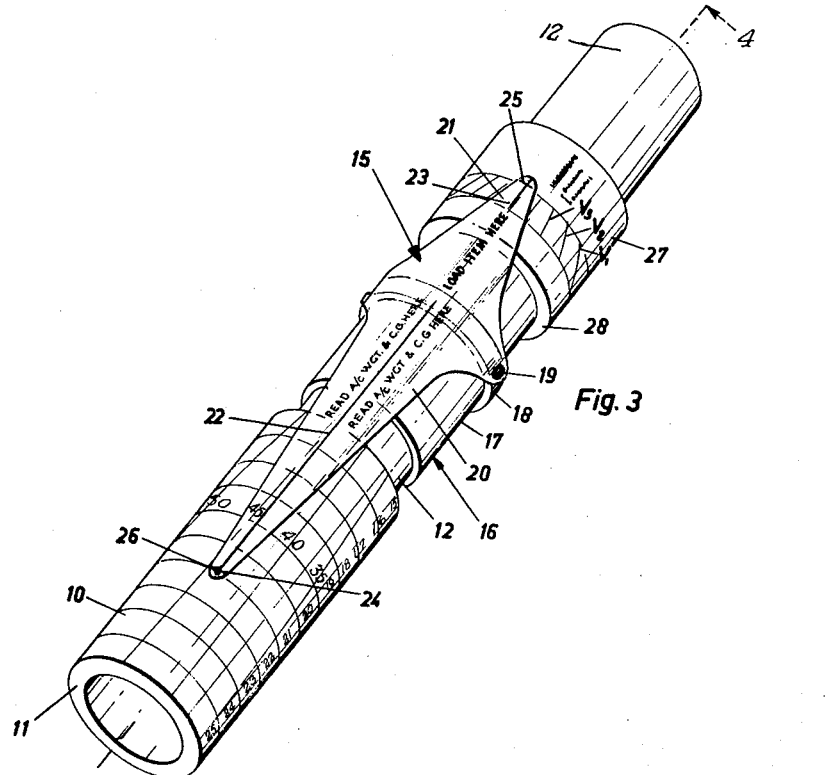
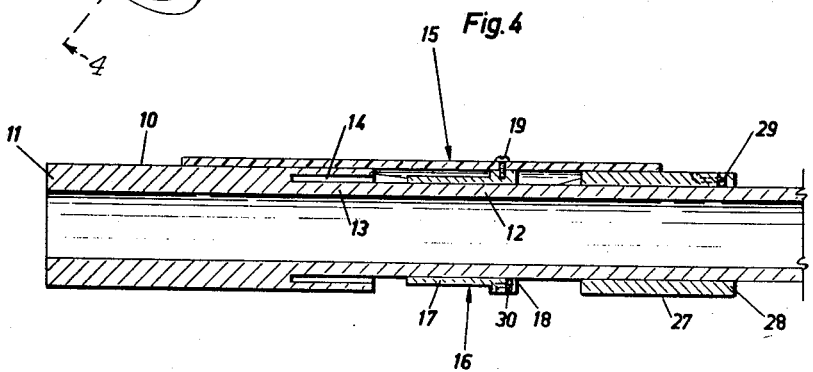
Inventor
REGINALD P. R. L. SAUNDERS
by: Cavanagh & Norman

United States Patent Office 3,012,715
Patented Dec. 12, 1961

3,012,715
CENTRE OF GRAVITY CALCULATOR
Reginald Peter Randal Lonsdale Saunders, Toronto, Ontario, Canada, assignor to The De Havilland Aircraft of Canada Limited, Downsview, Ontario, Canada
Filed Jan. 14, 1959, Ser. No. 786,770
7 Claims. (Cl. 235—61)

This invention relates to calculators and more particularly to load adjusters or load calculators.

In the loading of aircraft it is necessary to consider not only the weight added to the aircraft but the effect of the disposal of the weight in the aircraft upon the centre of gravity. It is possible to calculate the position of the centre of gravity for any aircraft, and, by assuming a fixed datum point, to calculate the moments of additional cargo, fuel and/or passengers placed in specific positions within the aircraft. From this it is possible to calculate the change in position of the centre of gravity caused by the addition of the cargo fuel and/or passengers.

It is an object of this invention to provide a calculator or load adjuster for an aircraft whereby the variations in load and load position may be utilized to determine the changed position of the centre of gravity.

It is a further object of this invention to provide a load adjuster which may be simply and relatively speedily operated without resort to mathematical calculations.

Further objects and advantages of the invention will become apparent from a consideration of the drawings in which:

FIGURE 3 shows a perspective view of a calculator of the invention, and

FIGURE 4 shows a cross section of the calculator along the lines 4—4 of FIGURE 3.

This invention is based on the fact that the position of the centre of gravity of an unloaded aircraft is known, and the change in the position of the centre of gravity of the aircraft caused by the addition of a known weight placed in a set position in the aircraft may be calculated.

It is also known for example that the addition of a known weight in say the tail of the aircraft will not cause the centre of gravity to move aft so much in the case of a heavily laden aircraft as in the case of a lighter aircraft. Thus, referring now to FIGURE 1, there is shown a typical projected view of a centre of gravity graph showing the percentage mean aerodynamic chord along one axis, and weight in thousands of pounds along the other axis. Such a graph is developed for any individual type of aircraft from the weight-moment graph for the aircraft by plotting the position of the centre of gravity as a percentage of the mean aerodynamic chord of the aircraft under different load conditions. The index scale, 0 to 180, which appears across the bottom of the graph is calibrated according to a simple mathematical formula related to the basic weight of the aircraft and the moment exerted by this weight about a pre-determined arbitrary axis across the aircraft. The index figure for any particular aircraft may readily be calculated according to the aforementioned formula and is utilized in this apparatus for determining the initial setting of the cursor in the manner hereinafter described.

Assuming now that for the sake of illustration the position of the centre of gravity of the aircraft in a normal unloaded state but equipped with standard equipment and its under carriage down and weighing 18,000 pounds is at 43% M.A.C. then the position of the centre of gravity may be shown on the graph at G. Now the addition of a 1000 pound load at the centre of gravity of the aircraft will place the centre of gravity at $G_1$ but will not alter its position relative to the leading edge of the chord of the aircraft.

Further if the undercarriage of the aircraft is retracted it will not alter the weight of the aircraft but it will change the position of the centre of gravity of the aircraft. As previously discussed the retraction of the undercarriage would result in a greater change in the case of an unloaded aircraft having its centre of gravity at G than it would in a more heavily loaded aircraft having its centre of gravity represented at $G_1$. Let the new positions of the centre of gravity be $G'$ and $G_1'$ respectively.

Figure 1:
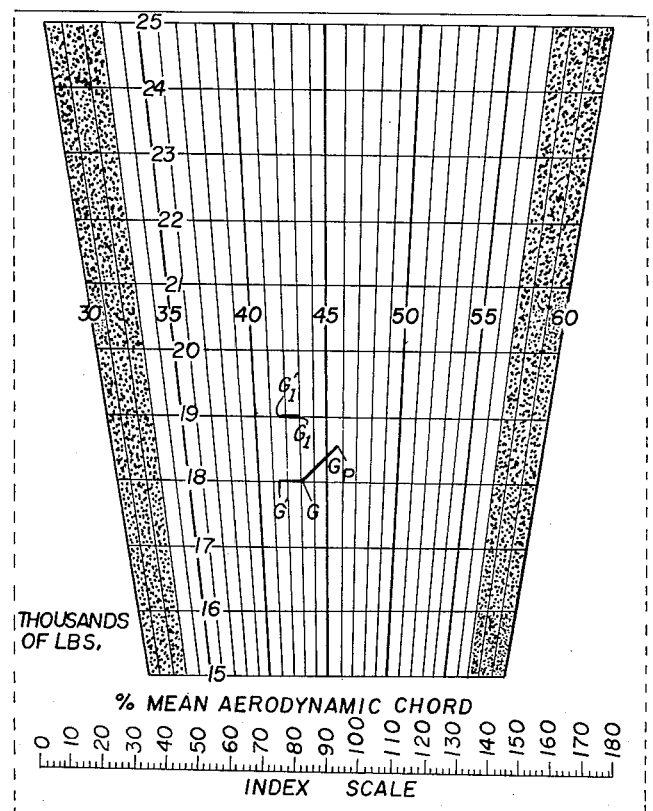
FIGURE 1 shows generally a projected view of a graph of the type used in the invention.

It will be seen that by virtue of the nature of the graph of FIGURE 1 although the distances $GG'$ and $G_1G_1'$ are the same allowance is made for the different effect on the position of the centre of gravity by virtue of the divergence of the lines representing percentage mean aerodynamic chord.

Thus the vector $GG'$ represents the change in the position of the centre of gravity by the retraction of the undercarriage and is constant, when represented on the graph of FIGURE 1. Similarly, the addition of a load of 500 pounds at a given position P may be calculated to cause the centre of gravity to change from G to $G_p$. Again the vector $GG_p$ represents the change of the centre of gravity on the graph of FIGURE 1, and is constant irrespective of the position of the starting point G. Thus, the effect of any load in any position in the aircraft may be reduced to a vector which may be shown on the graph of FIGURE 1, and as the vector as represented on the graph of FIGURE 1 for any given load does not depend on the initial position of the centre of gravity, one or more vectors may be added together progressively to show the change in position of the centre of gravity of the aircraft by the addition of extra loads, etc.

Thus, it is possible to calculate vectors which represent additional loads at specific points in the aircraft, a vector for the effect of raising the undercarriage, the addition of fuel etc., all of which or any combination of which may be plotted on graph 1.

As the safe limits in which movement of the centre of gravity of the aircraft may occur are known for any aircraft, these may be marked on the graph. Unsafe areas may be suitably shaded or coloured as shown, for example by the dotted areas on the graph of FIGURE 1.

Figure 2:
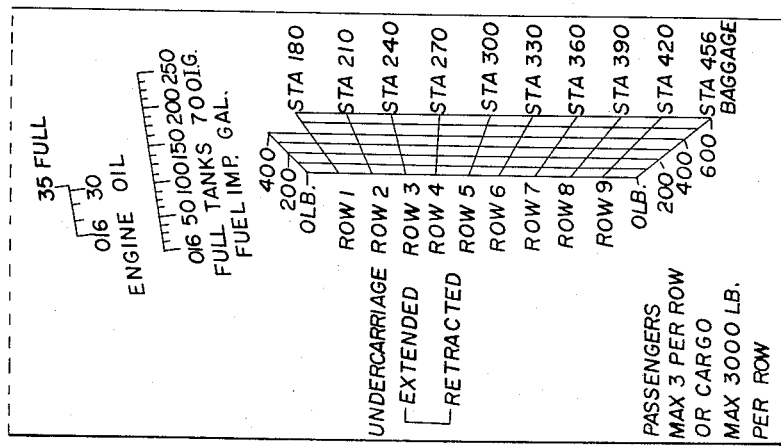
FIGURE 2 shows generally a projected view of a vector scale of the type used in the invention.

Typical vectors for loading the aircraft may be determined, and are illustrated on the projected view of a vector scale shown in FIGURE 2. It will be seen that the position of these vectors on the vector scale is not of material importance provided their length and direction relative to the base line of the graph of FIGURE 1 is correct. Thus, FIGURE 2 shows a generally projected view of a vector scale for an aircraft showing vectors for adding various loads or passengers at different positions in the aircraft, as well as vectors for the fuel and oil load and retraction of the undercarriage.

Turning now to FIGURE 3, in which a preferred embodiment of the invention is shown, a graph 10 of the type described in relation to FIGURE 1 is disposed on a cylinder 11. Cylinder 11 is provided with concentric supporting cylinder 12, which cylinder is of smaller diameter and extends beyond cylinder 11. End portion 13 of supporting cylinder 12 extends within cylinder 11. Annular groove 14 extends within cylinder 11 adjacent end 13 of support cylinder 12.

Cursor means 15 is mounted upon cursor mounting means 16 comprising a tubular support 17 adapted to slide and rotate on cylindrical support member 12 and within circular groove 14. One end of support 17 is provided with flange 18 to which is attached cursor 15 by any suitable means such as screws 19. Cursor 15 has two portions 20, 21 provided with hairlines 22, 23, these hairlines being arranged parallel to the axis of the cylindrical members. At the ends of the hairlines cross markers 24 and 25 are provided and a hole 26 (through which the point of a pencil may be passed to mark the graph 10) may also be provided for convenience. The length of hair line 22 is sufficient to enable the marker point 24 to extend to the top of graph 10. Portion 21 extends on the opposite side of cursor support flange 18 to portion 20 for purposes which will be described hereafter.

Vector scale 27 of the type described in relation to FIGURE 2 is disposed on cylindrical vector slide 28 which is rotatable and slidable on support cylinder 12.

Various vectors are shown on vector scale 27 and as previously described these vectors are valculated for the various dispositions of different loads etc., on the aircraft and are of the same size and angular disposition as they would be if plotted on graph 10. As there are a predetermined number of positions for loading any particular aircraft, these vectors may usually all be placed on a single scale. However, it is possible to provide additional vector slides (for example if the aircraft is used for both freight and passenger purposes). For this purpose vector slide 28 is easily removable from cylinder 12.

In order to ensure that both cursor means 15 and vector slide 28 do not slide too readily upon cylinder 12, friction means 29 and 30 in the form of springs or other suitable means may be used. It is also possible to provide spring clips (not shown) which will lock cursor means 15 and vector slide 28 in position unless released by the operator.

In operation the load adjuster is used as follows. Assuming the aircraft is unloaded, its index number and weight are known. Hole 26 (or the corresponding point defined by the cross marker 24 and hairline 22 if no hole is provided) is lined up with the index number on the index scale and the weight of the aircraft on graph 10, the final position of hole 26 indicating the location of the centre of gravity of the aircraft prior to loading. If a certain load is to be added in a certain part of the plane, the vector representing this load is found on vector scale 27. The end of this vector is then adjusted to come below the cross marker 25 on portion 21 of cursor means 15. Then without moving vector slide 28, cursor means 15 is moved so as to bring cross marker 25 over the other end of the vector selected. Thus, cross marker 25 has been moved in a path prescribed by the vector selected and thus, the hole 26 has traced a similar course over graph 10. By placing a pencil through hole 26, it is now possible to mark the new position of the centre of gravity of the aircraft on graph 10. The procedure may then be repeated for various loads in various positions giving the operator an instantaneous picture of the change of the centre of gravity effected by each load. It will readily be appreciated that the change in the position of the centre of gravity for unloading the aircraft may also be calculated merely by reversing the procedure and subtracting the vector in a manner similar to the above described operation. This has useful application in the case where cargo or persons, such as paratroopers, may be discharged during flight.

It will also be appreciated that special vectors may be provided for such items as fuel load and that the vectors themselves may be calibrated for example for one-quarter, half, full fuel load etc.

It is contemplated that variations and modifications may be made without departing from the scope of the invention, as defined in the following claims.

What I claim as my invention is:

1. A centre of gravity calculator for use on load carrying aircraft and the like comprising: a cylindrical support member; a graph scale mounted on said support member consisting of a chart having an X and Y axis, a group of diverging lines along its Y axis direction intersected by parallel lines along the X axis direction, said diverging lines being calibrated along their length in units representing the weight of an aircraft, said parallel lines being calibrated along their length in unit representing the position of the centre of gravity of said aircraft in relation to its length; a tubular sleeve member slidably carried by said cylindrical support member for sliding and rotational movement relative to said graph scale; a vector scale mounted on said tubular member consisting of a plurality of vector curves related to the effect of a predetermined load weight on the location of the centre of gravity of said aircraft and on its gross weight; and cursor means mounted coaxially with said graph and vector scales for rotation and sliding relative thereto for plotting said vector curves onto said graph scale to obtain the change in the centre of gravity of said aircraft resulting from a change in said load therein.

2. The centre of gravity calculator as claimed in claim 1 wherein said parallel lines are calibrated in units of percentage of the mean aerodynamic chord of said aircraft.

3. The centre of gravity calculator as claimed in claim 1 wherein said vector curves include one said curve representing the effect of the fuel load on said aircraft and another said curve representing the effect of the load of lubricating oil thereon.

4. The centre of gravity calculator as claimed in claim 1 wherein said vector curves include a group of curves representing the effect of predetermined passenger and freight load weights at different stations along the length of said aircraft.

5. The centre of gravity calculator as claimed in claim 1 wherein said vector curves include one said curve representing the effect of the raising and lowering of the landing gear of said aircraft thereon.

6. The centre of gravity calculator as claimed in claim 1 wherein said cursor includes a relatively long arm having a free end and movable by rotation and sliding along said cylindrical support member to extend said free end over substantially all portions of said graph scale, and a rearward extension of said arm forming a pointer of sufficient length to extend over the full extent of said vector scale.

7. The centre of gravity calculator as claimed in claim 1 including an index scale associated with said graph scale consisting of a series of markings calibrated in units related to the unladen weight of said aircraft and its calculated centre of gravity for plotting the same on said graph scale.

References Cited in the file of this patent

UNITED STATES PATENTS

| | | |
|---|---|---|
| 2,230,954 | Jakowsky | Feb. 4, 1941 |
| 2,365,494 | Schlieben | Dec. 19, 1944 |
| 2,432,738 | Fairbanks | Dec. 16, 1947 |
| 2,741,432 | Hisey | Apr. 10, 1956 |

FOREIGN PATENTS

| | | |
|---|---|---|
| 368,991 | Great Britain | Mar. 17, 1932 |